April 18, 1967 — N. H. SACHNIK — 3,314,643
THROTTLING VALVE
Filed Nov. 27, 1963
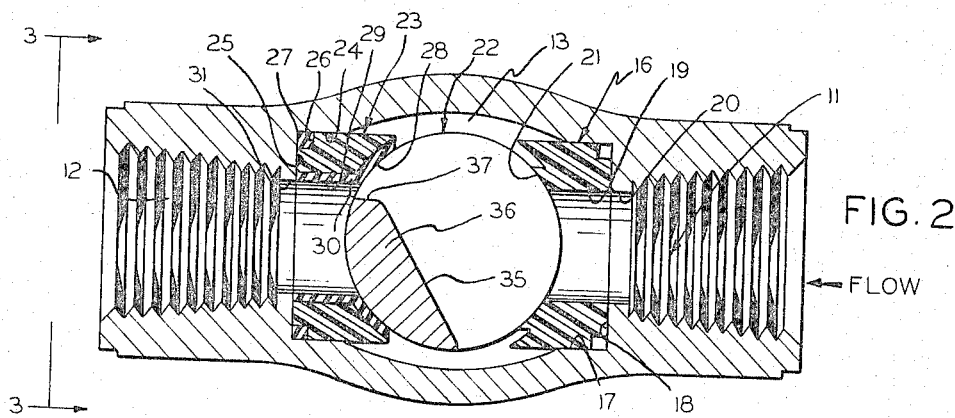
FIG. 2
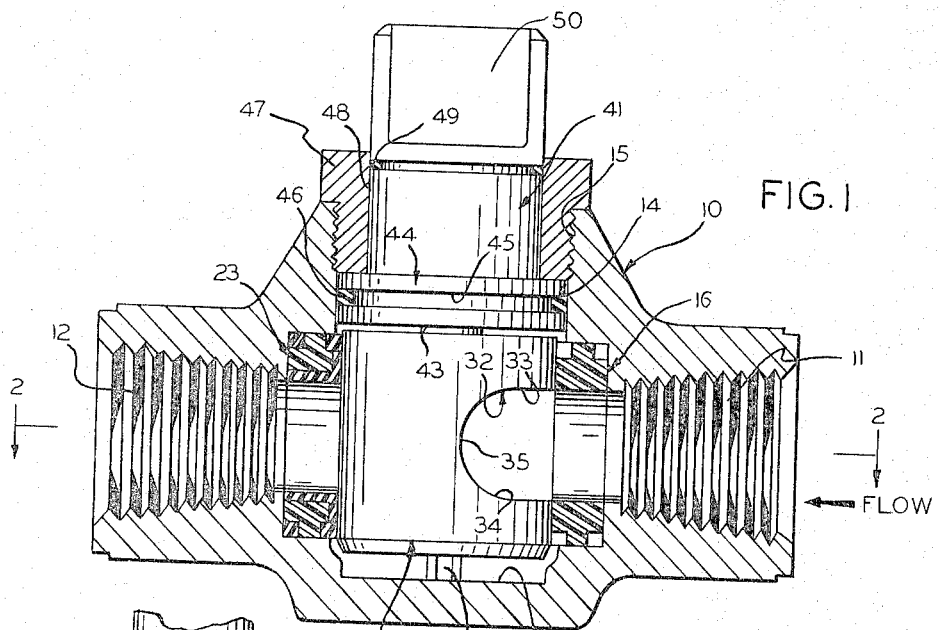
FIG. 1
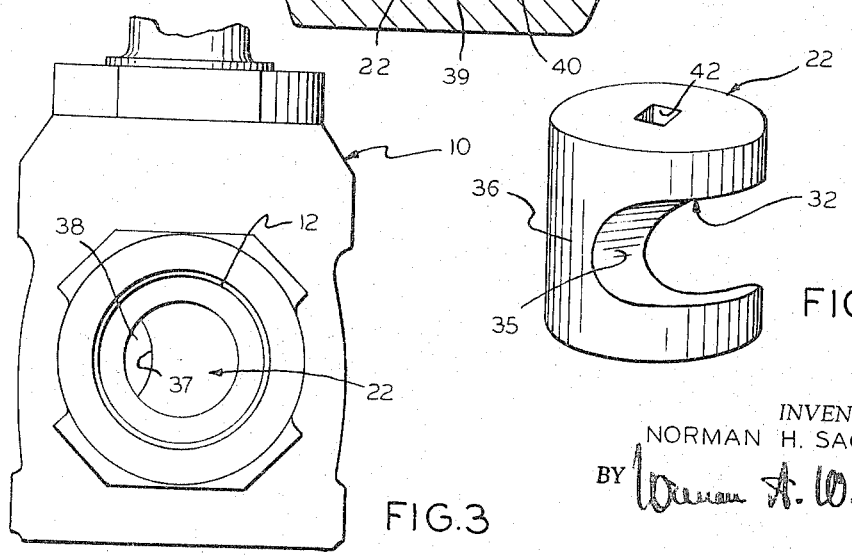
FIG. 3
FIG. 4
INVENTOR.
NORMAN H. SACHNIK
BY
ATTORNEY

United States Patent Office 3,314,643
Patented Apr. 18, 1967

3,314,643
THROTTLING VALVE
Norman H. Sachnik, Houston, Tex., assignor to
Texsteam Corporation
Filed Nov. 27, 1963, Ser. No. 326,557
1 Claim. (Cl. 251—309)

This invention relates in general to a fluid control valve for handling flow control applications, and more particularly to a throttling valve capable of defining a limited opening as is necessary for varying pressure requirements in a system, although other uses and purposes may be apparent to one skilled in the art.

Heretofore, a conventional lubricated plug valve has been employed for obtaining throttling conditions in flow control applications, but these valves have not been satisfactory because of high and frequent replacement costs. Such replacement was necessary in view of erosion of the plug which is caused by extreme turbulence within the valve and at the outlet port. Moreover, the upstream side forces tend to force out lubricant and allow the flowing fluid to cut the plug and body.

It is therefore an object of the present invention to obviate the above encountered difficulties and provide an improved throttling valve for use in flow control applications.

Another object of this invention is in the provision of a throttling valve that is economical to purchase and maintain, and which provides relatively straight-through-flow thereby reducing the turbulence upstream of the variable orifice.

Still another object of this invention resides in the provision of a throttling valve constructed to minimize erosive wear by providing a streamline fluid flow.

A further object of this invention is to provide a throttling valve that is compact and light weight, and constructed of such materials as to eliminate the need of lubrication, and which can be repaired in the line.

A still further object of this invention is in the provision of a throttling plug valve constructed so that the seats and plugs may be replaced economically, and so that there are no sharp turns to cut-out the valve by impingement of high velocity transient particles.

Another object of this invention resides in the provision of a throttling valve having a plug therein coacting with upstream and downstream seats, wherein the downstream seat is internally faced with resilient material for protection against impingement and to insure a positive seal between the seat and plug.

Another object of this invention resides in the provision of a throttling valve having a plug therein coacting with upstream and downstream seats, wherein the downstream seat is internally faced with hard erosion resistant materials, such as ceramics where high pressure drops occur.

Still another object of this invention is to provide a throttling plug valve wherein the upstream orifice is eliminated to thereby greatly minimize erosion.

A further object of this invention is to provide a throttling plug valve that can be employed to provide limited flow conditions as is necessary for varying pressure requirements.

A still further object of this invention is in the provision of a throttling plug valve that may also be employed as a shut-off valve.

Another object of this invention is to provide a throttling plug valve having a relatively straight-through-flow, and wherein the throttling surface is downstream of the seat and plug seal, thereby providing a reduction of turbulence upstream of the variable orifice.

Another object of this invention resides in the provision of a throttling plug valve wherein plugging is minimized because of the near-circular orifice that provides maximum passageway for suspended foreign matter.

Other objects, features and advantages of the invention will be apparent from the following detailed disclosure, taken in conjunction with the accompanying sheet of drawing, wherein like reference numerals refer to like parts, in which:

FIG. 1 is a longitudinal vertical sectional view taken through the throttling valve of the present invention;

FIG. 2 is a longitudinal horizontal view taken through the valve of the present invention and substantially along line 2—2 of FIG. 1;

FIG. 3 is an end elevational view of the valve of FIG. 2 and taken along line 3—3 thereof and looking in the direction of the arrows; and FIG. 4 is a perspective view of the plug employed in the valve of the present invention and removed from the valve body.

Referring now to the drawings, the valve of the present invention includes a body 10 having a tapped inlet port 11, a tapped outlet port 12 coaxially aligned with the inlet port, and a flow control chamber 13 arranged between the inlet and outlet ports. Further, a stem receiving bore 14 internally threaded at 15 extends upwardly from the flow control chamber 13 between the inlet and outlet ports and at right angles thereto. Preferably, the body 10 is made of ductile iron, although any other suitable material may be employed.

A circular guide seat 16 is mounted within the flow control chamber 13 in a bore 17 and against a shoulder 18 at the downstream or outlet end of the inlet port 11. A cylindrical passageway or opening 19 extends through the guide seat 16 and is of the same diameter as a cylindrical wall 20 arranged at the outlet end of the inlet port 11. The guide seat 16 is preferably of phenolic or other suitable material. The inner end or outlet end of the guide seat 16 is provided with an annular face 21 formed to intimately engage the external face of a cylindrical plug 22 that is arranged within the flow control chamber 13.

A throttling seat 23 is arranged within the flow control chamber 13 and at the inlet end of the outlet port 12. The throttling seat 23 is annular in shape, and received within a bore 24 and against an annular shoulder 25 in a similar fashion to that of the guide seat 16. Since it is desired to maintain a fluid seal relationship between the throttling seat and plug 22 at the outlet end of the valve to provide more effective throttling action, an annular notch 26 is provided at the downstream end and outer periphery of the throttling seat to accommodate packing or an O-ring 27 to thereby prevent leakage of fluid between the exterior side of the seat and the valve body.

The throttling seat 23 is primarily constructed of phenolic, although the surface subject to fluid impingement and engagement with the plug 22, namely, the curvate surface 28 in engagement with the plug 22 and the cylindrical passageway or opening 29, is provided with a layer 30 of resilient material and preferably Buna-N. The cylindrical passageway or opening 29 through the seat 23 is coextensive with a cylindrical wall 31 formed in the valve body and at the inlet end of the outlet port 12.

Where high pressure drops occur across the valve, the layer of resilient material 30 would be replaced by a hard erosion resistant material, such as a ceramic. In this instance, resilient material would be placed outside of the facing diameter for providing a seal.

The plug 22 is cylindrical with its rotational axis extending perpendicular to the axes of the seats and ports. Preferably the plug is constructed of a corrosion and erosion resistant material.

The plug 22 is formed to enable a throttling orifice to be defined ahead of the throttling seat and outlet port while permitting free fluid flow through the guide seat and inlet port. A transaxially cut-out portion 32 extends more than 180° around the periphery of the plug and includes upper and lower faces 33 and 34 which coalign with the upper and lower diametrical points of the openings 19 and 29 extending through the seats 16 and 23. A somewhat arcuate face 35 interconnects the innermost edges of the upper and lower faces 33 and 34 thereby defining a flow control portion 36. The vertical throttling edge of the flow control portion 36 is flattened horizontally at 37, as seen in FIG. 2, while being arcuate vertically to coact with the throttling seat 23 and define a restrictive throttling orifice 38 as seen particularly in FIG. 3. Deepening the throttling edge at the center forms the flattened appearance in the plug cross section of FIG. 2. By somewhat flatting the surface 37, turbulence beyond the orifice is minimized, and it will be appreciated that the orifice 38 is near-circular to decrease possible plugging of the valve. The surface 37 is angularly related to the concave face 35 at the throttling edge of the cut-out portion 32 to coact with the throttling seat 23 and define a near-circular throttling orifice when the plug 22 is in throttling position, such as shown in FIG. 3. The dimension of the flow control portion 36 is such that when the plug is turned to fully open the valve, a substantially unobstructed straight-through passageway is defined between the inlet and outlet ports. It should also be appreciated that the flow control portion 36 may be oriented to fully cover the opening 29 in the throttling seat 23 to permit the valve to function as a shut-off valve. Further, the engagement between the plug 22 and the resilient layer 30 of the throttling seat 23 provides a positive seal against fluid flow therebetween. When the valve is being employed as a throttling valve such as when the plug 22 assumes the position shown in either FIGS. 2 or 3, it will be appreciated that free and unimpeded flow of fluid exists at the inlet port and guide seat 16 to thereby reduce the turbulence upstream of the orifice 38, and consequently minimize erosive wear of the plug.

A plug support 39 is arranged between the bottom wall 40 of the flow control chamber 13 and the underside of the plug 22 to properly position and support the plug within the flow control chamber in proper alignment with the guide seat and throttling seat. A valve stem 41 extends upwardly through the stem receiving bore 14 and is suitably coupled to the upper end of the plug 22. In this connection, a socket 42 may be provided in the upper end of the plug 22 to receive a mating, driving portion 43 integral with the lower end of the stem 41. An annular flange 44, externally grooved at 45, is provided at the lower end of the stem 41 and in mating engagement with the stem bore 14 to define a bearing relationship therewith. Suitable packing, such as an O-ring 46, is placed in the groove 45 and serves to prevent fluid leakage between the flange 44 and the bore 14. A retaining nut 47 encircles the upper diametrically reduced portion 48 of the stem 41 and is threadedly received in the threaded portion 15 of the bore 14 to bear against the upper end of the flange 44 and properly position the stem and plug in the valve. Additional packing, such as an O-ring 49, is provided in a groove formed along the surface 48 between it and the nut 47 to prevent fluid leakage therealong. The upper, outer end of the stem 41 is polygonally shaped at 50 to receive a wrench or other suitable tool for rotation of the stem and plug.

In operation of the valve, it is only necessary to apply a wrench to the stem 41 to rotate the plug to any desired position for fluid flow control through the valve. It should also be appreciated that the valve may be quickly and easily repaired and that the plug and seats are easily replaceable. For example, to replace the seats 16 and 23, it is only necessary to remove the nut 47 to thereby permit withdrawal of the stem 41 and the plug 22, after which the seats 16 and 23 may easily be removed from the flow control chamber 13 and upwardly through the stem receiving bore 14, and replaced with new seats. Thus, the valve may be easily and quickly repaired without taking it out of the line.

From the foregoing, it should be appreciated that the valve of the present invention provides a high standard of operation for controlling fluid flow in a line and is particularly adaptable for straight-through-flow in that turbulence upstream of the variable orifice is substantially reduced to thereby minimize erosive wear of the plug.

It will be understood that modifications and variations may be effected without departing from the scope of the novel concepts of the present invention, but it is understood that this application is to be limited only by the scope of the appended claim.

The invention is hereby claimed as follows:

A throttling valve comprising, a valve body having coaxially aligned inlet and outlet ports and a control chamber therebetween, a guide seat within said chamber at the outlet end of said inlet port, a throttling seat within said chamber at the inlet end of the outlet port, said seats being of phenolic material and having circular openings therethrough in coaxial alignment with said ports, the surface of said throttling seat subjected to fluid impingement by flow of fluid through the valve being of rubber, and a cylindrical plug rotatably mounted within said chamber in engagement with and between said seats to control fluid flow through said valve, said plug having a transaxially extending cut-out portion aligned with said seat openings and opening through more than 180° of the periphery thereof, said cut-out portion defining upper and lower substantially parallel faces coaligning with the uppermost and lowermost diametrically opposed points of the seat openings, said faces being interconnected at their innermost edges by a concave face and defining a flow control portion, and a face angularly related to said concave face at the throttling edge of the cut-out portion coacting with said throttling seat opening to define a near-circular throttling orifice when the plug is in throttling position.

References Cited by the Examiner

UNITED STATES PATENTS

| Re. 24,102 | 12/1955 | Ohls | 251—317 X |
| 1,205,660 | 11/1916 | Peterson | 251—312 |
| 1,388,673 | 8/1921 | Trainer | 251—209 |
| 1,888,179 | 11/1932 | Nash | 251—368 X |
| 2,510,514 | 6/1950 | Mueller | 251—209 |
| 2,574,428 | 11/1951 | Wheatley | 251—316 X |
| 2,664,261 | 12/1953 | Stephany | 251—368 X |
| 2,832,563 | 4/1958 | Walsh | 251—368 X |
| 2,950,081 | 8/1960 | Steinbuch et al. | 251—368 X |
| 3,052,445 | 9/1962 | Kessler | 251—368 X |
| 3,210,042 | 10/1965 | Freeman | 251—315 X |

M. CARY NELSON, *Primary Examiner.*

ARNOLD ROSENTHAL, *Examiner.*